United States Patent [19]

Gibbs

[11] 4,255,306

[45] Mar. 10, 1981

[54] VINYLIDENE CHLORIDE POLYMER MICROGELS

[75] Inventor: Dale S. Gibbs, Midland, Mich.

[73] Assignee: The Dow Chemical Company, Midland, Mich.

[21] Appl. No.: 942,515

[22] Filed: Sep. 15, 1978

[51] Int. Cl.³ .................... C08F 14/08; C08F 114/08; C08F 214/08
[52] U.S. Cl. .................... 260/29.6 H; 526/296; 526/297; 526/323; 526/327; 526/330; 526/341; 526/342; 526/343; 526/329.3; 526/345
[58] Field of Search .................... 526/345, 344.2, 343, 526/323.2, 324; 260/29.6 H

[56] References Cited

U.S. PATENT DOCUMENTS

| | | | |
|---|---|---|---|
| 2,538,737 | 1/1951 | Stanton et al. | 526/329.4 |
| 3,285,887 | 11/1966 | de Vries | 526/323.2 |
| 3,317,450 | 5/1967 | Grenley et al. | 526/323.2 |
| 3,424,706 | 1/1969 | Smith et al. | 526/343 |
| 3,483,154 | 1/1969 | Gibbs | 526/329.4 |
| 4,022,849 | 5/1977 | Jin et al. | 260/876 R |

FOREIGN PATENT DOCUMENTS 967051 8/1964 United Kingdom .................. 526/323.2

OTHER PUBLICATIONS

W. Funke—J. Oil Col. Chem. Assoc. 1977, 60, 438–445.

Primary Examiner—Harry Wong, Jr.
Assistant Examiner—Peter F. Kulkosky
Attorney, Agent, or Firm—R. B. Ingraham

[57] ABSTRACT

Discrete, crosslinked vinylidene chloride polymer microgels, having a latex particle size of less than 1 micron and a gel content of about 1 to 99 percent, such microgels being obtained by emulsion polymerizing (a) about 50 to about 95 parts by weight of vinylidene chloride, (b) about 5 to about 50 parts by weight of a copolymerizable ethylenically unsaturated comonomer, and (c) about 0.1 to about 10 parts by weight of a copolymerizable crosslinking polyfunctional comonomer. Such microgels have been found to have wide applicability as additives for synthetic foams and fibers, and for the preparation of improved coatings, films, and redispersible latexes.

15 Claims, No Drawings

VINYLIDENE CHLORIDE POLYMER MICROGELS

BACKGROUND

The present invention pertains to novel, discrete, crosslinked vinylidene chloride polymer microgels which are particularly effective as additives for synthetic foams and fibers and for the preparation of improved coatings, films and redispersible latexes.

Microgel polymer structures are known in the art. For example, U.S. Pat. No. 3,285,887 discloses discrete, crosslinked polymers prepared by the emulsion polymerization of a mixture of a bifunctional crosslinking agent with an ethylenically unsaturated monomer selected from the class consisting of olefinic hydrocarbons, olefinic ethers, amides and esters. Such materials are described as being particularly useful as thickeners for lubricating oils.

Further, reactive microgels prepared by the emulsion polymerization of functional monomers, such as 1,4-divinylbenzene or various alkylene glycol-dimethacrylates are described in *J. Oil Col. Chem. Assoc.* 1977, 60, 438–445 by W. Funke. These materials are described as being useful as multifunctional crosslinkers for reinforcing purposes and as reactive components in condensation and addition polymerization reactions.

Reactive microgels prepared from divinylbenzene are also disclosed in the following articles:

Obrecht, Seitz, Funke, *Makromol. Chem.* 175, 3587 (1974).
Obrecht, Seitz and Funke, *Makromol. Chem.* 176, 2771 (1975).
Obrecht et al., *Makromol. Chem.* 177, 1877 (1976).
Obrecht et al., *Makromol. Chem.* 177, 2235 (1976).
Seitz et al., *Makromol. Chem.* 178, 1689 (1977).

Crosslinked polymers of vinyl halides, including copolymers of vinyl chloride and vinylidene chloride, are also known in the art. For example, U.S. Pat. No. 4,022,849 discloses crosslinked vinyl halide polymers for use as flame-retardant additives for thermoplastic materials.

It is an object of the present invention, however, to provide certain vinylidene chloride polymer microgels having unexpected applicability as flame-retardants and physical property enhancers for synthetic materials, such as polyurethane foams and acrylic fibers, and for the preparation of coatings, films, and latexes having improved characteristics.

More specifically, it is an object of this invention to provide vinylidene chloride polymer microgels which are dispersible in nonsolvents for vinylidene chloride polymers, such as polyols which are conventionally used to prepare urethane foams and elastomers, and which will further provide enhanced strength and flame-retardance to such materials.

It is another object to provide vinylidene chloride polymer microgels which can be easily introduced in synthetic fibers, such as acrylic fibers, to impart increased flame-ratardance thereto with only moderate loss in fiber processability or strength properties.

It is yet another object to provide vinylidene chloride polymer microgels which provide redispersible latexes.

It is a still further object to provide vinylidene chloride polymer microgel latexes which can be tailored to provide amorphous coatings having high vinylidene chloride content or crystalline coatings having greater flexibility.

It is another object to provide vinylidene chloride polymer microgels which may be used to provide lacquer coatings for substrates such as cellophane and other plastic films, such coatings providing improved heat seal temperatures and flexibility.

SUMMARY

The above and related objects are achieved by preparation and utilization of discrete, crosslinked polymer microgels obtained by emulsion polymerizing (a) about 50 to about 95 parts by weight of vinylidene chloride, (b) about 5 to about 50 parts by weight of a copolymerizable enthylenically unsaturated comonomer, and (c) about 0.1 to about 10 parts by weight of a copolymerizable crosslinking polyfunctional comonomer; said polymer microgels having a latex particle size of less than 1 micron and a gel content of about 1 to 99 percent.

In a specific embodiment (Preferred Embodiment No. 1) of this invention, discrete, crosslinked polymer microgels have been discovered which are readily dispersible in polyols, glycols, and other nonsolvents for vinylidene chloride polymers. These polymer microgels are obtained by emulsion polymerizing (a) about 50 to about 90 parts by weight of vinylidene chloride; (b) about 10 to about 50 parts by weight of a copolymerizable ethylenically unsaturated comonomer selected from the group consisting of alkyl esters of acrylic and methacrylic acids, methacrylic acid, and nitriles of ethylenically unsaturated carboxylic acids; and (c) about 1 to about 10 parts by weight of a copolymerizable crosslinking polyfunctional comonomer; said polymer microgels having a latex particle size of less than 1 micron, a gel content of about 25 to about 99 percent, and a second order transition temperature of at least about 30° C. Polymer microgels of this type are particularly useful as flame-retardant additives for polyurethane foam and elastomers, epoxy resins, and poly--ester resins, and are also especially useful as additives for polyols for providing enhanced load-bearing properties to polyurethane foams prepared therefrom.

In another embodiment (Preferred Embodiment No. 2) of this invention, discrete, crosslinked vinylidene chloride polymer microgels have been discovered which can be incorporated into solid materials such as synthetic fibers. These polymer microgels are obtained by emulsion polymerizing (a) about 80 to about 95 parts by weight of vinylidene chloride; (b) about 5 to about 20 parts by weight of a copolymerizable ethylenically unsaturated comonomer selected from the group consisting of alkyl esters of acrylic and methacrylic acids having from 1 to about 8 carbon atoms in the ester group, acrylonitrile, methacrylonitrile, vinyl chloride, vinyl bromide, vinyl acetate, vinyl propionate, and vinyl 2-ethylhexanoate; and (c) about 1 to about 10 parts by weight of a copolymerizable crosslinking polyfunctional comonomer; said polymer microgels having a latex particle size of less than 1 micron and a gel content of about 1 to about 50 percent. Polymer microgels of this type are particularly useful as flame-retardant additives for acrylic fibers.

In still another embodiment (Preferred Embodiment No. 3) of this invention, discrete, crosslinked vinylidene chloride polymer microgels have been discovered which readily disperse in solvents for vinylidene chloride polymers, e.g., mixtures of tetrahydrofuran and toluene. These polymer microgels are obtained by emulsion polymerizing (a) about 85 to about 92 parts by weight of vinylidene chloride; (b) about 8 to about 15 parts by weight of a copolymerizable ethylenically unsaturated comonomer selected from the group consisting of methyl acrylate, methyl methacrylate, acrylonitrile, methacrylonitrile, vinyl chloride, vinyl bromide, and vinyl acetate; and (c) about 1 to about 10 parts by weight of a copolymerizable crosslinking polyfunctional comonomer; said polymer microgels having a latex particle size of less than 1 micron and a gel content of about 25 to about 99 percent. Polymer microgels of this type are particularly useful for the preparation of coatings, e.g., as barrier coatings, for substantially water-insoluble substrates, and for the preparation of self-supporting oriented or unoriented film materials.

In yet another embodiment (Preferred Embodiment No. 4) of this invention, discrete, crosslinked vinylidene chloride polymer microgels have been discovered which readily disperse in aqueous media. These polymer microgels are obtained by emulsion polymerizing (a) about 50 to about 85 parts by weight of vinylidene chloride; (b) about 15 to about 50 parts by weight of a copolymerizable ethylenically unsaturated comonomer selected from the group consisting of acrylonitrile, methacrylonitrile, methyl methacrylate, and methyl acrylate; (c) about 1 to about 10 parts by weight of a copolymerizable crosslinking polyfunctional comonomer; and (d) about 5 to about 25 parts by weight of a comonomer selected from the group consisting of acrylamide, acrylic acid, methacrylic acid, hydroxyethyl acrylate, hydroxypropyl acrylate, hydroxyethyl methacrylate, and hydroxypropyl methacrylate; said polymer microgels having a latex particle size of about 0.15 to about 0.5 micron, a gel content of about 10 to about 75 percent, and a second order transition temperature of at least about 25° C. Polymer microgels of this type are particularly useful as a binder in applications where high salt concentration or polyvalent ions are encountered, e.g., in the modification of cement mixtures.

In a further embodiment (Preferred Embodiment No. 5) of this invention, two species of microgel latexes have been discovered which are particularly useful for the preparation of coatings and for the preparation of self-supporting film materials. The first species, which provides permanently amorphous coatings having a high vinylidene chloride content, comprises the product obtained by emulsion polymerizing (a) about 88 to about 92 parts by weight of vinylidene chloride, (b) about 6 to about 12 parts by weight of methyl acrylate or methyl methacrylate, (c) about 1 to about 5 parts by weight of a copolymerizable crosslinking polyfunctional comonomer, and (d) about 1 to about 10 parts by weight of a comonomer selected from the group consisting of acrylic acid, methacrylic acid, itaconic acid, and fumaric acid; said microgels having a particle size of about 0.1 to about 0.5 micron, a gel content of about 1 to about 50 percent, and a second order transition temperature less than about 30° C.

The second microgel latex species, which provides crystalline coatings having improved flexibility, comprises the product obtained by emulsion polymerizing (a) about 90 to about 94 parts by weight of vinylidene chloride, (b) about 6 to about 10 parts by weight of methyl acrylate or methyl methacrylate, and (c) about 1 to about 5 parts by weight of a copolymerizable crosslinking polyfunctional comonomer; said microgels having a particle size of about 0.1 to about 0.5 micron, a gel content of about 1 to about 50 percent, and a second order transition temperature less than about 30° C.

DETAILED DESCRIPTION OF THE INVENTION

The crosslinked vinylidene chloride polymer microgels of the present invention are prepared by polymerizing the desired monomers in an aqueous emulsion according to processes well known in the art. Preferably, the polymerization is carried out be essentially continuous, carefully controlled addition of the requisite polymerization constituents (including polymerization initiator systems if desired) to the aqueous medium.

Generally, it is preferred to start the polymerization by adding a small amount of monomeric material to the aqueous medium and then adding the desired polymerization initiator to form a polymeric seed latex to aid in the control of particle size. The aqueous medium in which the seed latex is formed will contain the necessary surfactants to form the emulsion and will generally be adjusted to the desired pH value, as is well known in the art. Following the formation of the seed latex, the remaining amount of monomeric material is continuously added under carefully controlled conditions to the aqueous medium.

Exemplary copolymerizable ethylenically unsaturated comonomers which can be utilized in the present invention include the alkyl esters of acrylic and methacrylic acids such as methyl acrylate and methyl methacrylate; hydroxyalkyl esters of acrylic and methacrylic acids such as hydroxypropyl acrylate, hydroxyethyl acrylate, and hydroxybutyl acrylate; vinyl esters of saturated carboxylic acids such as vinyl acetate; amides of ethylenically unsaturated carboxylic acids such as acrylamide; nitriles of ethylenically unsaturated carboxylic acids such as acrylonitrile and methacrylonitrile; ethylenically unsaturated carboxylic acids such as acrylic acid; ethylenically unsaturated alcohols such as allyl alcohol; vinyl halides such as vinyl chloride and vinyl bromide; and other ethylenically unsaturated monomers known to polymerize with vinylidene chloride.

Exemplary copolymerizable crosslinking polyfunctional comonomers which can be employed include 1,3-butylene glycol diacrylate, 1,4-butane diol diacrylate, allyl acrylate, vinyl acrylate, 1,3-butylene glycol dimethacrylate, 1,4-butane diol dimethacrylate, allyl methacrylate, vinyl methacrylate, and the like. The actual amount of polyfunctional comonomer to be used will depend upon the crosslinking efficiency of the particular polyfunctional comonomer used, the size of the resulting latex particles, and the ethylenically unsaturated comonomer which is included in the polymerization recipe. Generally, it can be stated that sufficient polyfunctional comonomer should be used to provide a gel content of about 1 to about 95 percent. In practice, the optimum gel content to be achieved will vary with the particular end use being contemplated, as indicated by the prescribed gel contents for the aforementioned preferred embodiments of the present invention. With respect to Preferred Embodiment No. 3, for example, it has been found that as the gel content is increased, especially above 50 percent, the microgels become increasingly dispersible in the solvent and the dispersions become increasingly less viscous. If the gel content is reduced significantly below 50 percent, however, the microgels swell to too great an extent causing higher viscosity at lower solids content in the dispersions approaching linear copolymer behavior.

As used herein, "percent gel" is determined by the following technique: Add 36.6 ml tetrahydrofuran (THF) and a predetermined amount ($W_S$), usually about 0.7–1.2 g, of the desired microgel to a 50 ml centrifuge tube. Cap the tube and then agitate it overnight (usually about 12 hours) on a horizontal agitator. Thereafter, centrifuge the tube at 19,000 rpm for about 1 hour at 5° C. Extract 10 ml of the resulting supernatant liquid and place it into an evaporating dish. Evaporate most of the THF over low heat and then complete the drying by placing the dish in an oven for about 1 hour at 40° C. Finaly, determine the weight ($W_F$) of resin in the dish and calculate gel content by the following formula:

$$\text{Percent Gel} = 100 \times \left[ 1 - \frac{3.66\ W_F}{W_S} \right]$$

The second order transition temperature—or glass transition temperature (Tg), as it is often referred to in the art—is varied in the preferred embodiments of this invention to achieve optimum microgel properties for the particular end use being contemplated. For example, in those applications where it is desirable to recover the microgels from the latex in the form of a powder and then mix the powder in a liquid with moderate shear so that substantially all of the original microgels are regenerated in such liquid (e.g., in the application of Preferred Embodiment No. 1), it is advantageous to use a greater proportion of crosslinking monomer and/or a greater proportion of an ethylenically unsaturated comonomer which increases Tg to prevent sintering of the microgels during recovery.

The latex particle size of the microgels of the present invention should be less than 1 micron, preferably in the range of about 0.05 to about 0.5 micron. Methods for controlling particle size, e.g., seeding, variation of emulsifier concentration, addition of emulsifier in stages, rate of emulsifier addition, and the like, are well known in the art.

If it is desired to use the crosslinked vinylidene chloride polymer microgels of the present invention in the form of a dried powder, e.g., in the end-use application described with respect to Preferred Embodiment No. 1, the microgels can be recovered from the latexes by conventional techniques, preferably by coagulating the latex and then washing and drying the coagulum to produce a fine powder or by spray drying. The optimum temperature for coagulation will vary depending upon the type and amount of comonomer employed in preparing the microgels and particularly upon the second order transition temperature of the so-formed microgels. Generally, the coagulation temperature will be in the range of about 50° to 70° C., preferably from about 50° to 60° C.

The following nonlimiting examples, wherein all parts and percentages are by weight, will serve to illustrate the present invention:

EXAMPLE 1 (Illustrative of Preferred Embodiment No. 1)

A. Preparation of Vinylidene Chloride Polymer Microgels Which are Dispersible in Nonsolvents for Vinylidene Chloride Polymers The following recipe and polymerization technique were used to prepare polymer microgels which are redispersible in a polyol.

INITIAL WATER PHASE 1800 g water
15 g AEROSOL MA emulsifier
pH adjusted to 3.5 with glacial acetic acid

REDUCING AGENT 9.75 g HYDROSULFITE AWC reducing agent in 1000 g aqueous solution
Feed rate=10 g/hr

INITIATOR 5.0 g of 83% t-butyl hydroperoxide (TBHP) in 1000 g aqueous solution
Feed rate=10 g/hr

MONOMER FOR SEED LATEX REACTION 450 g vinylidene chloride (VDC)
50 g methyl methacrylate (MMA)
20 g 1,3-butylene glycol dimethacrylate (BGDM)
Used 150 g in seed latex reaction

AQUEOUS EMULSIFIER STREAM 236 g of 45% DOWFAX 2A1 emulsifier in 1600 g of aqueous solution
Used 800 g in 20 hours (Feed rate=40 g/hr

MONOMER MIX 800 g MMA (20 parts by weight)
3200 g VDC (80 parts by weight)
160 g BGDM (4 parts by weight)
Used 2500 g in 20 hours (Feed rate=125 g/hr

FINISHING

Fed hydrosulfite and TBHP at 10 g/hr for one hour

The initial water phase was poured into a two-gallon Pfaudler reactor and the reactor pressure tested for leaks at 35 psi with nitrogen. The nitrogen was then released. The reactor was placed under a vacuum of 25 inches Hg and the reactor was heated to a temperature of 40° C. The vacuum was then shut off and 150 g of the seed latex monomer was added to the reactor while agitating the contents thereof. Immediately thereafter, pumping of the hydrosulfite and TBHP was begun at 10 g/hr for each stream. The seed latex reaction was completed in approximately one hour as indicated by a drop in pressure of 2 psi from the maximum pressure attained during the seed latex reaction. When the pressure reached such point, introduction of the monomer mix at 125 g/hr and the aqueous emulsifier stream at 40 g/hr were begun and continued for 20 hours, while maintaining the flow of the reducing agent and initiator streams at 10 g/hr each. After the monomer and emulsifier streams were shut off, the reducing agent and initiator streams were pumped at 10 g/hr for one hour to complete the reaction. The resulting polymer microgels were found to have a gel content above 25% and a second order transition temperature of about 34° C.

The polymer microgels were collected from the latex by conventional alum coagulation techniques and then air dried. 200 Grams of the dry microgel powder was mixed into 800 g of polyol with a spatula and then passed through a colloid mill to break up the powder particles. When adequately mixed, microscopy revealed that many of the original microgels were present. Some aggregates of particles were observed, but it was not apparent that the particles in the aggregates were sintered together, but may have just gathered together during microscopy. All of the aggregates were less than 100 microns in cross section.

By way of comparison, a conventionally prepared non-crosslinked copolymer containing essentially the same amount of MMA and VDC and coagulated in the same procedure had many solid particles of a size greater than 1000 microns following the same degree of shearing in the polyol, and was further characterized by a gel content of 0% and a second order transition temperature of about 34° C. (hereafter Comparative Sample No. 3).

B. Evaluation of the Polymer Microgels as a Means of Enhancing the Physical Properties of a Polyurethane Foam Polyurethane foam samples were prepared by first mixing the desired polymeric additive with the following ingredients:

| Ingredient | Amount (grams) |
|---|---|
| VORANOL® 4701 polyol | 200 |
| Silicone surfactant | 2 |
| 70% solution of bis(N,N-dimethylaminoethyl) ether in dipropylene glycol | 0.15 |
| 50% solution of stannous octoate in di(2-ethylhexyl)phthalate | 0.6 |
| 33% solution of triethylenediamine in dipropylene glycol | 0.8 |
| Diethanolamine | 2.4 |
| Water | 5.2 |

To the above, 70.4 g of toluene diisocyanate were added, with blending. As soon as foaming had started, the mixture was poured into a container and permitted to foam over a period of 5 minutes. The resulting foamed polyurethane was then heated in a 120° C. oven for a period of 10 minutes, compressed to open the cells, and reheated for a period of 15 additional minutes at 120° C.

The following Table I sets forth the physical properties of such foam samples containing varying amounts and types of polymeric additives:

TABLE I

| Sample Identification | Wt. % Used | Tear Strength lb/in | 25% Compression lb/4 in² | 65% Compression lb/4 in² |
|---|---|---|---|---|
| For Comparison | | | | |
| 1. Control (no additive) | 0.0 | 1.0 | 1.0 | 2.0 |
| 2. Styrene/acrylonitrile copolymer (Niax-34-28) | 10 | 1.8 | 1.3 | 3.0 |
| 3. Non-crosslinked Emulsion Copolymer of 80 wt % VDC and 20 wt % MMA | 15 | 1.23 | 1.03 | 2.93 |
| The Invention | | | | |
| 4. Polymer microgels of Example 1(A) | 15 | 1.96 | 1.47 | 4.83 |

The data set forth in Table I above illustrate the advantages obtained by utilizing the polymer microgels of the present invention as an additive for a polyurethane foam.

Similar good results are obtained utilizing any of the polymer microgels identified herein as being within the Preferred Embodiment No. 1 of the present invention.

EXAMPLE 2 (Illustrative of Preferred Embodiment No. 2)

A. Preparation of Vinylidene Chloride Polymer Microgels Which can be Incorporated in Synthetic Fibers.

The following recipe was used for preparing polymer microgels which may be easily incorporated in an acrylic fiber:

INITIAL WATER PHASE 1800 g water
15 g AEROSOL MA80 emulsifier
pH adjusted to 3.5 with glacial acetic acid

REDUCING AGENT 9.75 g HYDROSULFITE AWC reducing agent in 1000 g aqueous solution
Feed rate = 10 g/hr

INITIATOR 11.7 g of 83% TBHP in 1000 g aqueous solution
Feed rate = 10 g/hr

AQUEOUS EMULSIFIER STREAM 476 g of 16.7% NaSEM solution in 1600 g of aqueous solution
Used 800 g in 20 hours (Feed rate = 40 g/hr)

MONOMER FOR SEED LATEX REACTION

Used 150 g of monomer mix (below)

MONOMER MIX 400 g acrylonitrile (VCN) (10 parts by weight)
3600 g VDC (90 parts by weight)
80 g BGDM (2 parts by weight)
Used 2,500 g in 20 hours (Feed rate = 125 g/hr)

The initial water phase was poured into the two-gallon reactor and the reactor was pressure tested at 25 psi using nitrogen. The nitrogen was then released and the reactor was put under vacuum and heated to 40° C. for 20 minutes. After the vacuum was shut off and the contents of the reactor were at 40° C., agitation was begun at 140 rpm and 150 g of monomer mix was introduced to the reactor for the seed latex reaction. Immediately thereafter, addition of the reducing agent and initiator streams were begun at 10 g/hr each. When the seed latex reaction was completed, as indicated by a drop in pressure to approximately 10 inches Hg vacuum, addition of the monomer mix at 125 g/hr and the aqueous emulsifier stream at 40 g/hr were begun, while continuing to feed reducing agent and initiator at 10 g/hr. After the monomer and emulsifier streams were shut off, the reducing agent and initiator were pumped an additional two hours to complete the reaction. The so-formed polymer microgels were found to have a gel content below 50% and a latex particle size less than 1 micron.

The method to recover the polymer microgels from the latex was not critical. Coagulation, freeze drying and air drying are all methods that provided powders which are redispersible in a solvent used for spinning acrylic fibers.

B. Evaluation of the Polymeric Microgels as Flame-Retardant Additives for Acrylic Fibers To prepare a spinning solution, the microgel powder of Example 2(A) was first thoroughly dispersed in dimethyl formamide (DMF) using a high shear agitator and then polyacrylonitrile resin was added to bring the spinning solution to 25% solids. The sequence of addition of the microgel powder is important. If the microgel powder is added alone first to the DMF, it disperses in less than 30 minutes. However, if the polyacrylonitrile is added first, a uniform dispersion of the microgel powder cannot be obtained in a reasonable period of time.

Spinning solutions containing the polyacrylonitrile and the microgel powder were wet spun into a bath containing 55 weight percent DMF in water at 5° C. to form crude fibers. The fibers, having a chlorine content of about 30%, were washed thoroughly with water to remove the DMF. If the DMF is not thoroughly removed, the burning tests are rendered meaningless. The fibers were dried in air overnight. All of the fibers were self-extinguishing in a vertical, burning down test in air.

A series of fibers were prepared for limiting oxygen index (LOI) tests. These fibers are described in the data set forth in the following Table II.

TABLE II

| Sample Number | Microgel (wt %) | Phosphorus (wt %) | Sb$_2$O$_3$ (wt %) | LOI |
|---|---|---|---|---|
| For Comparison | | | | |
| 5 | None | None | None | 18 |
| The Invention | | | | |
| 6 | 45 | None | None | 23 |
| 7 | 45 | None | 2 | 27 |
| 8 | 45 | None | 6 | 28 |
| 9 | 45 | 1 | None | 26 |

The above data illustrate that the polymer microgels contemplated by the present invention may be readily incorporated into acrylic fibers to impart significantly enhanced flame-retardant properties thereto, and that such microgels may be used in combination with other flame-retardant materials. Similar beneficial results are obtained utilizing any of the polymer microgels identified herein as being within the Preferred Embodiment No. 2 of the present invention.

EXAMPLE 3 (ILLUSTRATIVE OF PREFERRED EMBODIMENT NO. 3)

A. Preparation of Vinylidene Chloride Polymer Microgels Which Readily Disperse in Commonly Used Solvents for Vinylidene Chloride Polymers Two different samples of polymeric microgels were prepared by emulsion polymerization using sodium persulfate thermal initiator and continuous addition of mixed monomers.

Each emulsion polymerization was conducted in a one-gallon reactor with agitator and temperature control. The initial water phase charged to the reactor is listed below:
1500 g distilled water
80% active emulsifier
14.2 g AEROSOL MA emulsifier (80% active)
3.4 g TERGITOL 08 emulsifier (39% active)
3.0 g initiator (sodium persulfate)
10.9 g itaconic acid The mixture of monomers for the reactor was as described below:

| Monomer | Mole % | Parts | Grams |
|---|---|---|---|
| VDC | 90 | 89.71 | 1794 |
| MMA | 10 | 10.29 | 206 |
| BGDM | 3.54[1] | 4.0 | 80 |

Note:
[1] Based on the moles of VDC + MMA

In each of the polymerizations, the initial water phase was charged to the reactor and a vacuum was applied (approximately 25 inches Hg) for 10 minutes while heating the reactor to 45° C. With the contents of the reactor at 45° C. and agitation at 200 rpm, the vacuum was shut off and an initial shot of 90 g of the monomer mixture was added to form a seed latex. When the seed latex reaction had proceeded until there was a pressure drop in the reactor of 2 psi, the monomer mixture was fed at 118 g/hr and continued for 12 hours. The total weight of monomer added, including the seed latex monomer, was 1500 g.

When the continuous feeding of monomer was completed, different finishing steps were used to obtain the two different samples of microgels:

Finishing Step #1

In this finishing step, the reaction was completed after the monomer feed is shut off by allowing the reaction to proceed with agitation to level pressure at 45° C., which took about two hours. The latex was then cooled and removed from the reactor in preparation for polymer recovery.

Finishing Step #2

In this finishing step, 15 minutes before the end of monomer feed, a 0.37% solution of sodium bisulfite was added at 100 g/hr for two hours while maintaining the temperature at 45° C. In addition, 3 percent based on the combined weight of VDC and MMA used, of methyl acrylate (MA) was added over a 30 minute period after the monomer feed was shut off. After the bisulfite stream had been added for the two-hour period, that stream was then shut off and the latex was removed from the reactor for polymer recovery.

The polymer microgels were separately recovered from each of the resulting latexes according to the following CaCl$_2$ coagulation technique: 35 cc of 30% CaCl$_2$ was mixed with 1000 cc water and heated to 40° C. Then, 300 cc of latex was slowly added to the CaCl$_2$ solution with vigorous agitation. The temperature of the mixture was then increased to 70° C. to bring about crystallization and set the crumb size. The mixture of coagulated microgels, water, and CaCl$_2$ was then rapidly cooled to room temperature with ice and the microgel coagulum was collected in a centrifuge with water washing. The coagulum was dried to less than 2% water content for evaluation as a coating material. The so-obtained polymer microgel powders had a gel content above 50 percent.

B. Evaluation of the Polymer Microgels in Lacquer Coating Compositions

Lacquer stability testing for linear copolymer solutions normally emphasizes the haze test using light transmission as a measure of lacquer clarity. However, the microgel lacquers are very turbid right from the start, so haze or light transmission values are not useful in measuring the stability of such lacquers. Accordingly, lacquer stability was determined by measuring the viscosity of 20 wt % microgel in a solvent mixture. For a lacquer to be satisfactory, the viscosity must not drift up significantly in 24 hours, e.g., if starting at 20 cps, viscosity drift above 30 cps in 24 hours would not be desirable.

Coating tests were conducted on coated polyester film. The film was coated with a lacquer containing 15 percent polymer solids in a solvent mixture of 65/35 weight ratio tetrahydrofuran (THF)/toluene (TOL). The coating weight was adjusted to 4 g/m². The coated film was aged 16 hours at 60° C. to insure development of crystallinity before testing the coating.

Moisture vapor transmission rate (MVTR) was measured with a Riegel-Mocon Mode IRD-2 Infrared Diffusometer. The data are reported as grams $H_2O$ passed per 100 square inches in 24 hours for the coating weight of 4 g/m².

A Robot automatic controlled air operated jaw sealer was used for measuring the minimum heat-seal temperature (MHST). Heat seals were made at 5 degree intervals between 95° C. and 135° C. using 20 psi jaw pressure and one second dwell time. The MHST is the temperature at which coating deformation is first observed when the seal is opened.

Cold peel adhesion (CPA) was evaluated by coating one side of a polyester film with a microgel lacquer containing a small amount of dye. The coating was cured for 3 minutes at 120° C. and then conditioned for 16 hrs at 90% relative humidity and 100° F. The coated film was cut into one inch wide strips and a piece of glass fiber-reinforced tape was applied both to the coated side and to the uncoated side of the strips. The tapes were pulled apart to separate the coating from the film using an Instron tensile tester. The results are expressed as grams adhesion per inch of width.

Table III sets forth the composition of the interpolymers and the lacquer stability, MHST, CPA, and MVTR of coatings prepared therefrom. For purposes of identification, the lacquers containing microgels of the present invention are hereinafter identified as Samples 13 and 14. For purposes of comparison, a series of lacquers containing different vinylidene chloride polymers were prepared and tested substantially as described above. These interpolymers are identified in Table III as Sample Nos. 10, 11 and 12.

TABLE III

| | POLYMER COATING PROPERTIES | | | |
|---|---|---|---|---|
| Sample Number | Lacquer Stability | MVTR (g/100 in²/ 24 hours) | MHST (°C.) | CPA (g/in) |
| For Comparison | | | | |
| 10 | Fair at 24 hours[1] | 0.18 | 110 | 20 |
| 11 | Very good at 24 hrs[1] | 0.29 | 105 | 20 |
| 12 | Poor at 3 hours[1] | 0.14 | 125 | 30 |
| The Invention | | | | |
| 13 | Very good at 2 days[1] | 0.18 | 110 | 160 |
| 14 | Very good at more than 5 days[2] | 0.41 | 95 | >100 |

Notes:
[1]Solvent mixture comprising 65 percent THF and 35 percent TOL.
[2]Solvent mixture comprising 65 percent TOL and 35 percent THF.

SAMPLE POLYMER IDENTIFICATION

10. Conventional non-crosslinked, emulsion polymerized polymer of 87 percent VDC, 10 percent methacrylonitrile (MAN), and 3 percent MMA, having a particle size of about 0.15 micron.

11. Conventional non-crosslinked, emulsion polymerized polymer of 92 percent VDC, 5.3 percent VCN, and 2.7 percent MMA, having a particle size of about 0.15 micron.

12. Conventional non-crosslinked, emulsion polymerized polymer of 90 percent VDC and 10 percent MMA, having a particle size of about 0.16 micron.

13. Polymer microgels obtained in Example 3(A) using Finishing Step No. 1.

14. Polymer microgels obtained in Example 3(A) using Finishing Step No. 2.

The data set forth above illustrate that the polymer microgels of the present invention are capable of forming highly effective coating materials from solvents normally used to dissolve vinylidene chloride polymers. Such coatings are also characterized by significantly enhanced adhesion to polyester film substrates as compared to conventional, non-crosslinked vinylidene chloride polymer coating materials. Such enhanced adhesion may well be due to the morphology of the prescribed polymer microgel. Similar good results are obtained using any of the polymer microgels identified herein as being within the Preferred Embodiment No. 3 of this invention.

EXAMPLE 4 (ILLUSTRATIVE OF PREFERRED EMBODIMENT NO. 4)

A. Preparation of Vinylidene Chloride Polymer Microgels Which Readily Disperse in Aqueous Media The polymer microgels were prepared by emulsion polymerization using the following recipe and polymerization techniques:

INITIAL WATER PHASE 2400 g deionized water
16 g 80% active dihexylester of sodium sulfo-succinic acid emulsifier
pH adjusted to 3.5 with acetic acid

REDUCING AGENT 18 g HYDROSULFITE AWC reducing agent in 1000 g aqueous solution
Feed rate = 10 g/hr

SEED LATEX MONOMER

90 MMA
410 g VDC
10 g 1,3-butylene glycol diacrylate (BGDA)

Used 150 g in seed latex reaction

INITIATOR 10 g of 83% TBHP in 1000 g aqueous solution
Feed rate=10 g/hr

MIXED MONOMERS 600 g MMA (15 parts by weight)
3400 g VDC (85 parts by weight)
80 g BGDA (2 parts by weight)
Used 2500 g in 10 hours (Feed Rate=250 g/hr)

AQUEOUS EMULSIFIER STREAM 66.25 g of NaSEM, 530 g acrylamide, and 5 cc of 10% sodium salicylate in 1600 g aqueous solution
Used 800 g in 10 hours (Feed rate=80 g/hr)

The initial water phase was placed in a suitable reactor equipped with agitator and temperature control. The reactor was placed under vacuum for 10 minutes while being heated to 40° C. and agitated at 100 rpm. After the contents of the reactor reached 40° C., the vacuum was shut off and 150 grams of seed latex monomer was added. Introduction of reducing agent and initiator streams was begun immediately after this shot of monomer at a rate of 10 g/hr for each stream. When the seed latex reaction had proceeded to a pressure drop of about 4 to 6 psi, introduction of the mixed monomer stream at 250 g/hr and the aqueous emulsifier stream at 80 g/hr were begun and continued for 10 hours. After the monomer and emulsifier streams were shut off, the reaction was finished by pumping the initiator and reducing agent for one hour at 10 g/hr. The so-formed latex was then spray-dried to obtain a microgel powder having a gel content of about 15 percent and a second order transition temperature of 30° C.

B. Evaluation of the Polymer Microgels for Dispersibility in Water

The microgels of Example 4(A) were dispersed in water using an Eppenbach homogenizer and the mixture was then placed in a suitable container. After one month, less than 1 percent by weight of the mirogels had settled to the bottom of the container, indicating very good redispersibility in water.

Similar results are obtained using any of the polymer microgels identified herein as being within the Preferred Embodiment No. 4 of the present invention.

EXAMPLE 5 (ILLUSTRATIVE OF PREFERRED EMBODIMENT NO. 5)

A. Preparation of a Permanently Amorphous Vinylidene Chloride Polymer Microgel Latex for Plastic Film Coating The microgel latex was prepared by emulsion polymerization using the following recipe:

INITIAL WATER PHASE 1800 g deionized water
16 g 80% active dihexylester of sodium sulfo-succinic acid emulsifier
pH adjusted to 3.5 with acetic acid

REDUCING AGENT 18 g HYDROSULFITE AWC reducing agent in 1000 g aqueous solution
Feed rate=10 g/hr

SEED LATEX MONOMER 90 g MMA
410 g VDC
10 g BGDA
Used 150 g in seed latex reaction

INITIATOR 10 g of 83% TBHP in 1000 g aqueous solution
Feed rate=10 g/hr

MIXED MONOMERS 400 g MMA (10 parts by weight)
3600 g VDC (90 parts by weight)
80 g BGDA (B 2 parts by weight)
Used 2500 g in 10 hours (Feed rate=250 g/hr)

AQUEOUS EMULSIFIER STREAM 53 g NaSEM and 212 g acrylic acid (AA) in 1600 g aqueous solution
Used 800 g in 10 hours (Feed rate=80 g/hr)

The initial water phase was placed in a suitable reactor equipped with agitator and temperature control. The reactor was placed under a vacuum of about 25 inches Hg for 10 minutes while being heated to 40° C. and agitated at 100 rpm. After the contents of the reactor reached 40° C., the vacuum was shut off and 150 g of seed latex monomer was added. Introduction of reducing agent and initiator streams were begun immediately after this shot of monomer and were added at a rate of 10 g/hr for each stream. When the seed latex reaction had proceeded to a pressure drop of about 4 to 6 psi, introduction of the mixed monomer stream at 250 g/hr and the aqueous emulsifier stream at 80 g/hr were begun and continued for 10 hours. After the monomer streams were shut off, the reaction was finished by pumping the reducing agent and initiator for one hour at 10 g/hr for each stream. The so-formed latex contained microgels having a size less than about 0.2 micron, a gel content of less than about 25 percent, and a second order transition temperature below about 20° C.

B. Evaluation of the Polymer Microgel Latex as a Coating for Substantially Water-Insoluble Film Substrates The microgel latex of Example 5(A) was coated onto a corona treated polypropylene film to provide a continuous, essentially amorphous coating having good adhesion and a low heat-seal temperature.

C. Preparation of a Vinylidene Chloride Polymer Microgel Latex Which Forms a Coating Having Excellent Creased Barrier According to the procedure of Example 5(A), except for the following changes in the recipe, a microgel latex was prepared by emulsion polymerization.

SEED LATEX MONOMER 40 g MMA
460 g VDC
10 g BGDA

INITIATOR 3.0 g 83% TBHP in 1000 g aqueous solution
Feed rate=10 g/hr

AQUEOUS EMULSIFIER STREAM 53 g NaSEM in 1600 g aqueous solution

Used 800 g in 10 hours (Feed rate=80 g/hr)

MIXED MONOMERS 320 g MMA (8 parts by weight)
3680 g VDC (92 parts by weight)
80 g BGDA (2 parts by weight)
Used 2500 g in 10 hours (Feed rate=250 g/hr)

Coatings of this microgel latex on paper crystallize only slightly, have good barrier properties, low heat-seal temperature, and excellent creased barrier. The heat-seal temperature and creased barrier do not change significantly during aging of the coating.

Similar good results are obtained using any of the polymer microgel latexes identified herein as being within the Preferred Embodiment No. 5 of the present invention.

What is claimed is:

1. Discrete, crosslinked polymer microgels obtained by emulsion polymerizing (a) about 50 to about 95 parts by weight of vinylidene chloride, (b) about 5 to about 50 parts by weight of a copolymerizable ethylenically unsaturated comonomer, and (c) about 0.1 to about 10 parts by weight of a copolymerizable crosslinking polyfunctional comonomer; said polymer microgels having a latex particle size of less than 1 micron and a gel content of about 25 to 99 percent.

2. Discrete, crosslinked polymer microgels which are readily dispersible in polyols and other nonsolvents for vinylidene chloride polymers, said polymer microgels being obtained by emulsion polymerizing (a) about 50 to about 90 parts by weight of vinylidene chloride; (b) about 10 to about 50 parts by weight of a copolymerizable ethylenically unsaturated comonomer selected from the group consisting of alkyl esters of acrylic and methacrylic acids, nitriles of ethylenically unsaturated carboxylic acids, methacrylic acid; and (c) about 1 to about 10 parts by weight of a copolymerizable crosslinking polyfunctional comonomer; said polymer microgels having a latex particle size of less than 1 micron, a gel content of about 25 to about 99 percent, and a second order transition temperature of at least about 30° C.

3. The polymer microgels of claim 2 consisting essentially of (a) about 80 parts by weight of vinylidene chloride, (b) about 20 parts by weight of a copolymerizable ethylenically unsaturated comonomer selected from the group consisting of acrylonitrile, methacrylonitrile, and methyl methacrylate, and (c) about 2 to about 4 parts by weight of 1,3-butylene glycol dimethacrylate.

4. The polymer microgels of claim 2 wherein the gel content ranges from about 50 to about 99 percent.

5. The polymer microgels of claim 2 consisting essentially of (a) about 60 to about 70 parts by weight of vinylidene chloride, (b) about 30 to about 40 parts by weight of methyl acrylate, and (c) about 2 to about 4 parts by weight of a copolymerizable crosslinking polyfunctional comonomer.

6. Discrete, crosslinked vinylidene chloride polymer microgels which can be incorporated into synthetic fibers, said polymer microgels being obtained by emulsion polymerizing (a) about 80 to about 95 parts by weight of vinylidene chloride; (b) about 5 to about 20 parts by weight of a copolymerizable ethylenically unsaturated comonomer selected from the group consisting of alkyl esters of acrylic and methacrylic acids having from 1 to about 8 carbon atoms in the ester group, acrylonitrile, methacrylonitrile, vinyl chloride, vinyl bromide, vinyl acetate, vinyl propionate, and vinyl 2-ethylhexanoate; and (c) about 1 to about 10 parts by weight of a copolymerizable crosslinking polyfunctional comonomer; said polymer microgels having a latex particle size of less than 1 micron and a gel content of about 25 to about 50 percent.

7. The polymer microgels of claim 6 consisting essentially of (a) about 95 parts by weight of vinylidene chloride, (b) about 5 parts by weight acrylonitrile, and (c) about 2 parts by weight 1,3-butylene glycol dimethacrylate.

8. Discrete, crosslinked vinylidene chloride polymer microgels which readily disperse in solvents for vinylidene chloride polymers, said polymer microgels being obtained by emulsion polymerizing (a) about 85 to about 92 parts by weight of vinylidene chloride; (b) about 8 to about 15 parts by weight of a copolymerizable ethylenically unsaturated comonomer selected from the group consisting of methyl acrylate, methyl methacrylate, acrylonitrile, methacrylonitrile, vinyl chloride, vinyl bromide, and vinyl acetate; and (c) about 1 to about 10 parts by weight of a copolymerizable crosslinking polyfunctional comonomer; said polymer microgels having a latex particle size of less than 1 micron and a gel content of about 25 to about 99 percent.

9. The polymer microgels of claim 8 consisting essentially of (a) about 90 parts by weight of vinylidene chloride, (b) about 10 parts by weight methyl methacrylate, and (c) about 2 to about 4 parts by weight 1,3-butylene glycol dimethacrylate.

10. The polymer microgels of claim 8 wherein the gel content ranges from about 50 to about 99 percent.

11. Discrete, crosslinked vinylidene chloride polymer microgels which readily disperse in aqueous media, said polymer microgels being obtained by emulsion polymerizing (a) about 50 to about 85 parts by weight of vinylidene chloride; (b) about 15 to about 50 parts by weight of a copolymerizable ethylenically unsaturated comonomer selected from the group consisting of acrylonitrile, methacrylonitrile, methyl methacrylate, and methyl acrylate; (c) about 1 to about 10 parts by weight of a copolymerizable crosslinking polyfunctional comonomer; and (d) about 5 to about 25 parts by weight of a comonomer selected from the group consisting of acrylamide, acrylic acid, methacrylic acid, hydroxyethyl acrylate, hydroxypropyl acrylate, hydroxyethyl methacrylate, and hydroxypropyl methacrylate; said polymer microgels having a latex particle size of about 0.15 to about 0.5 micron, a gel content of about 10 to about 75 percent, and a second order transition temperature of at least about 25° C.

12. A coating latex containing discrete, crosslinked vinylidene chloride polymer microgels, said latex comprising the product obtained by emulsion polymerizing (a) about 88 to about 92 parts by weight of vinylidene chloride; (b) about 6 to about 12 parts by weight of methyl acrylate or methyl methacrylate; (c) about 1 to about 5 parts by weight of a copolymerizable crosslinking polyfunctional comonomer; and (d) about 1 to about 10 parts by weight of a comonomer selected from the group consisting of acrylic acid, methacrylic acid, itaconic acid, and fumaric acid, said microgels having a particle size of about 0.1 to about 0.5 micron, a gel content of about 25 to about 50 percent, and a second order transition temperature less than about 30° C.

13. The latex of claim 12 obtained by emulsion polymerizing (a) about 90 parts by weight of vinylidene chloride, (b) about 10 parts by weight of methyl methacrylate, (c) about 2 parts by weight of 1,3-butylene glycol diacrylate, and (d) about 4 parts by weight of acrylic acid.

14. A coating latex containing discrete, crosslinked vinylidene chloride polymer microgels, said latex comprising the product obtained by emulsion polymerizing (a) about 90 to about 94 parts by weight of vinylidene chloride, (b) about 6 to about 10 parts by weight of methyl acrylate or methyl methacrylate, and (c) about 1 to about 5 parts by weight of a copolymerizable crosslinking polyfunctional comonomer, said microgels having a particle size of about 0.1 to about 0.5 micron, a gel content of about 25 to about 50 percent, and a second order transition temperature less than about 30° C.

15. The latex of claim 14 obtained by emulsion polymerizing (a) about 92 parts by weight of vinylidene chloride, (b) about 8 parts by weight of methyl methacrylate, and (c) about 2 parts by weight of 1,3-butylene glycol diacrylate.

* * * * *